Oct. 27, 1970    G. M. WILLIAMS ETAL    3,535,793
APPARATUS PARTICULARLY ADAPTED FOR MEASURING DISTANCE
BETWEEN TWO MARKS ON A GENERALLY PLANAR OBJECT
Original Filed Dec. 12, 1966    2 Sheets-Sheet 1
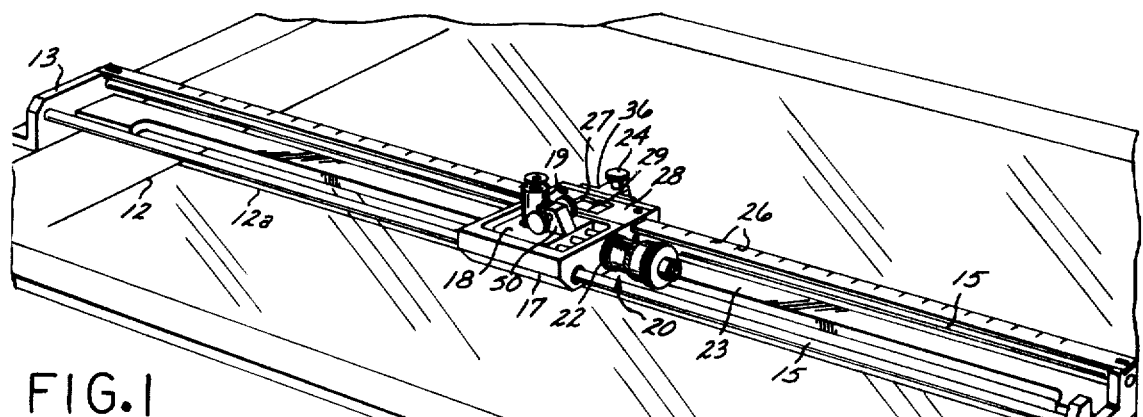
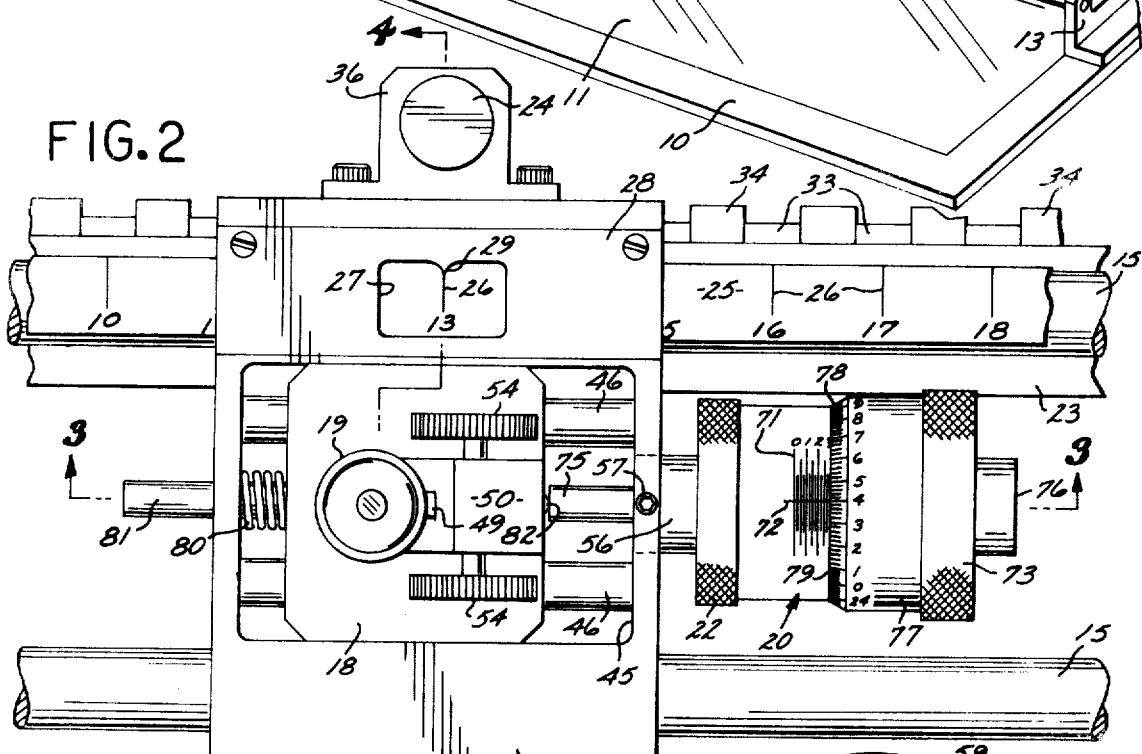
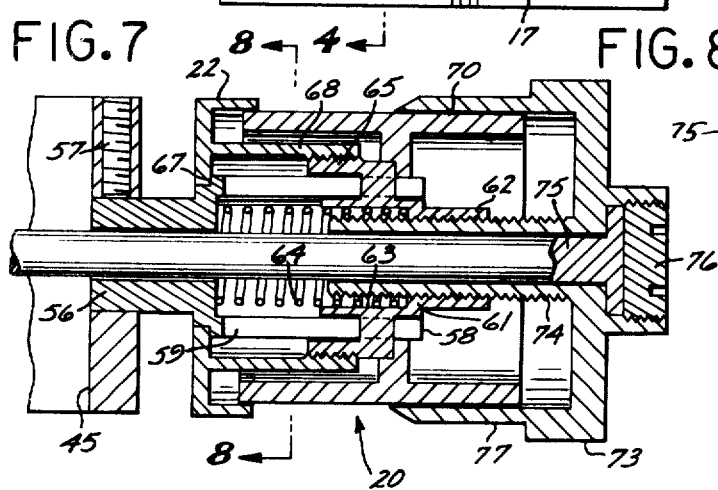
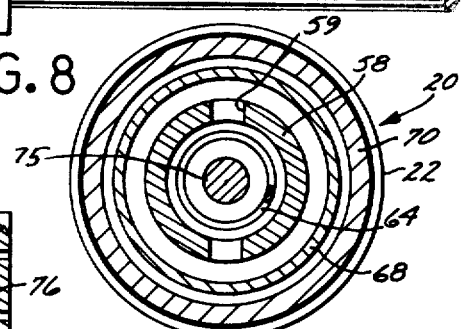
INVENTORS.
GERALD M. WILLIAMS
ROBERT P. SEGUINE
BY
Noel J. Conway
ATTORNEY Oct. 27, 1970    G. M. WILLIAMS ETAL    3,535,793
APPARATUS PARTICULARLY ADAPTED FOR MEASURING DISTANCE
BETWEEN TWO MARKS ON A GENERALLY PLANAR OBJECT
Original Filed Dec. 12, 1966    2 Sheets-Sheet 2
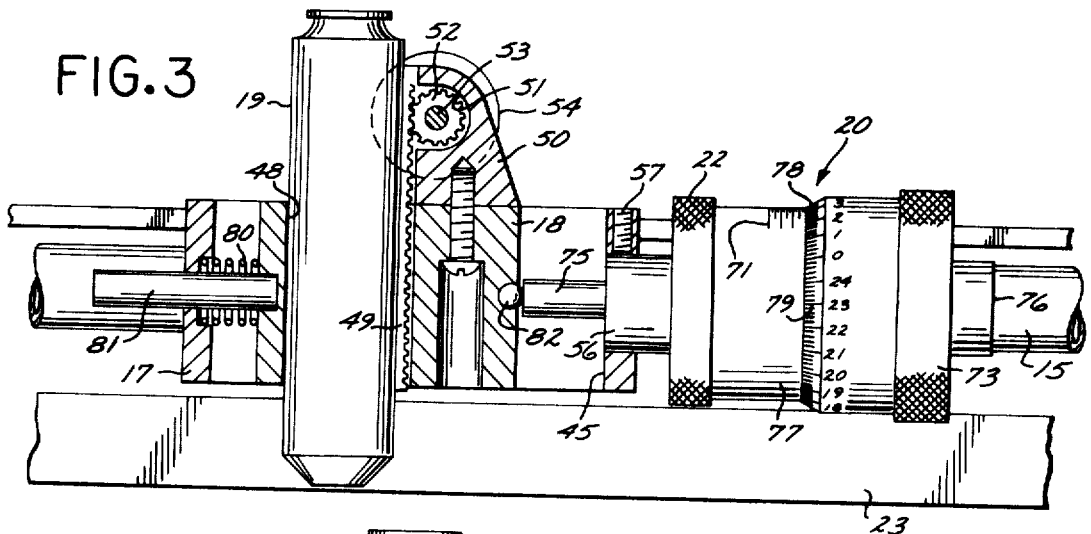
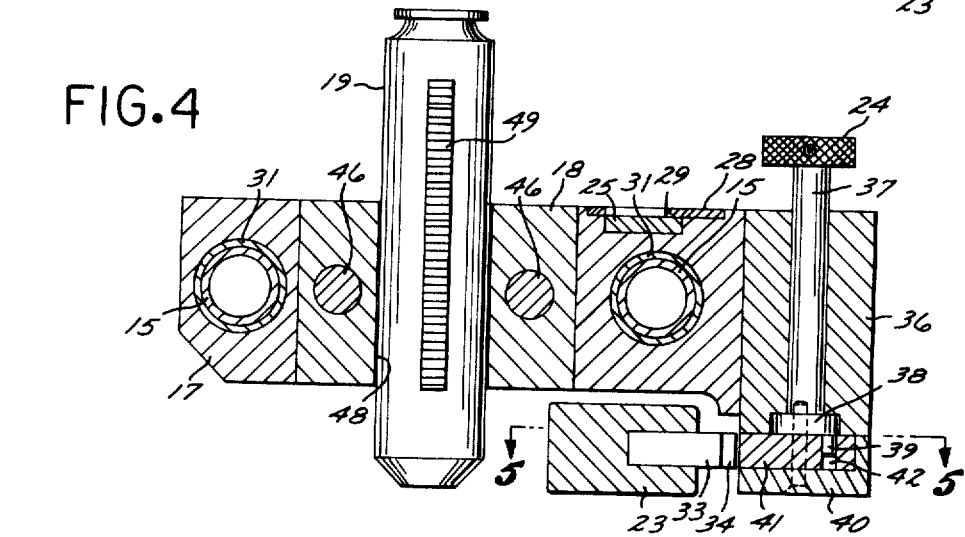
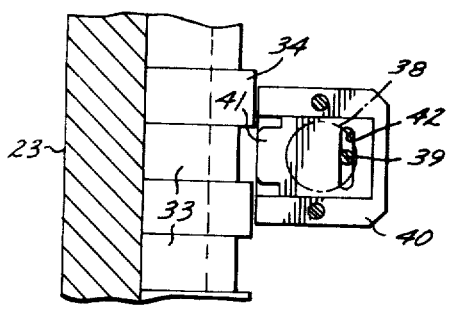
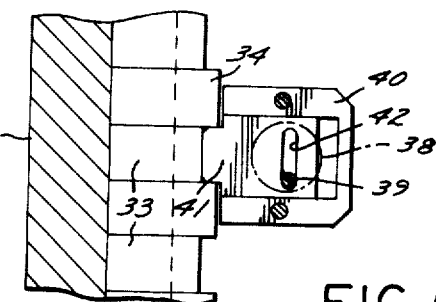
FIG.5    FIG.6
INVENTORS.
GERALD M. WILLIAMS
ROBERT P. SEGUINE
BY
Noel V. Conway
ATTORNEY

United States Patent Office 3,535,793
Patented Oct. 27, 1970

3,535,793
APPARATUS PARTICULARLY ADAPTED FOR MEASURING DISTANCE BETWEEN TWO MARKS ON A GENERALLY PLANAR OBJECT
Gerald M. Williams, Fullerton, and Robert P. Seguine, Montebello, Calif., assignors to Precision Photography, Inc., Fullerton, Calif., a corporation of California
Continuation of application Ser. No. 601,047, Dec. 12, 1966. This application Oct. 20, 1969, Ser. No. 867,949
Int. Cl. G01b 3/00, 3/18
U.S. Cl. 33—125                                1 Claim

ABSTRACT OF THE DISCLOSURE

A light table with a track disposed above it and movably supporting a carriage which may be indexed at locations along said track which locations are a predetermined distance apart; and including a microscope disposed on a sub-carriage which is carried by and may be moved relative to the carriage by means of a micrometer type unit which indicates on a scale located on a barrel part the position of the microscope relative to the carriage, and further including coaxial sleeve means for axially adjusting the barrel part of the micrometer type unit to adjust thereby the indication of the relation of the microscope to the carriage.

---

This application is a continuation of our copending application Ser. No. 601,047, filed Dec. 12, 1966, now abandoned.

This invention relates to apparatus particularly adapted for measuring distance between two marks on a generally planar object, and more specifically to such apparatus which is used to make such measurements on sheet materials such as photo negatives for printed circuits.

It is oftentimes desirable to measure very accurately the distance between two marks on a large planar object such as drawings, photo negatives, printed circuit boards and front panels for electrical component consoles. With embodiments of the present invention, this can be quickly accomplished.

It is a major object of this invention to provide an improved apparatus for measuring distance between two marks on a generally planar object.

Another object of this invention is to provide an improved measuring apparatus which is able to measure relatively long distances very accurately.

Still another object of this invention is to provide measuring apparatus for measuring distance between two marks on a planar object, which apparatus may be economically manufactured and easily used.

It is still a further object of this invention to provide measuring apparatus for measuring distance between two marks on a planar object, which apparatus includes provision for minor adjustment of an optic device to facilitate proper location of the apparatus relative to the planar object.

It is still another object of this invention to provide measuring apparatus including a horizontal track disposed above a horizontal table and an optic unit carried on a carriage which may be rapidly moved from one position to another on said track to accomplish the measuring task with rapidity.

It is a still a further object of this invention to provide measuring apparatus including an optic unit carried by a carriage movably supported on a track, which apparatus has provisision for very accurately changing the location of the optic unit relative to the carriage and has means for measuring the location of the optic unit relative to the carriage very accurately.

It is still another object of this invention to provide measuring apparatus including an optic unit supported on a carriage with means for changing the location of the optic unit on the carriage and compact means for adjusting the indication of the location of the optic unit on the carriage.

Other and further objects of this invention will become apparent in the detail description below in connection with the attached drawings wherein:

FIG. 1 is a perspective view of a preferred embodiment of the invention;

FIG. 2 is an enarged fragmentary plan view of the carriage and associated components of the measuring apparatus disclosed in FIG. 1;

FIG. 3 is a fragmentary partially cutaway view of the components shown in FIG. 2 taken along line 3—3 in FIG. 2;

FIG. 4 is a paritally cutaway fragmentary view of the carriage and optic unit taken along line 4—4 in FIG. 2;

FIG. 5 is a fragmentary view of part of the means for locking the carriage of the apparatus relative to the track in a desired position with the pawl of the means in the retracted position, taken along line 5—5 in FIG. 4;

FIG. 6 is a view as in FIG. 5 but with the pawl in the extended position;

FIG. 7 is an enlarged cross sectional view of the mechanism for adjusting the position of the optic unit relative to the carriage; and, FIG. 8 is a cross sectional view of the positioning unit taken along line 8—8 in FIG. 7.

A light table with a track disposed above it and movably supporting a carriage which may be indexed at locations along said track which locations are a predetermined distance apart; and including, a microscope disposed on a subcarriage which is carried by and may be moved relative to the carriage by means of a micrometer-type unit which indicates on a scale the position of the microscope relative to the carriage, and further includes means for adjusting the scale of the micrometer-type unit to adjust thereby the indication of the relation of the microscope to the carriage.

Referring now to the drawings, the preferred embodiment of the present invention will be described in further detail. The following description is in connection with measuring the distance between two marks on an engineering drawing, however it is to be understood that this is merely an exemplary use of the apparatus.

In FIG. 1, there can be seen a light table 10 having a horizontal translucent glass 11 which is back-lighted in some conventional means. For a purpose to be described, the glass 11 has etched in it a line 12 extending at a right angle to the front of the table 10 and a line 12a extending parallel to the front of the table.

Disposed at the ends of the table 10 are upstanding support brackets 13 which support therebetween a pair of parallel guide rods 15. As can be seen, there is provided a carriage 17 movably disposed on and supported by the track formed by said guide rods 15. The carriage 17, in turn, supports a sub-carriage, or optic support block, 18 which supports a microscope 19 disposed with its optical axis of view in the vertical condition. For purposes to be described, the microscope 19 has a cross hair therein (not shown) extending at a right angle to the guide rods 15.

By means to be described, the subcarriage 18 is movably supported on said carriage 17, and the location of the sub-carriage 18 (and therefor the microscope 19) may be changed by means of position means, indicated generally by the arrow 20. As will be described in further detail below, the position means 20 includes a scale by which the position of the subcarriage 18 relative to the carriage 17 can be accurately measured. On the other hand, it has been found that it is very beneficial to provide a means to adjust the scale of the position means 20 relative to the carriage 17 in order to simplify the placement of the drawings on the light table 10. To this end, there is provided adjustment means which includes a hand wheel 22. The preferred structure of the adjustment means and the position means will be described in further detail below.

Before going on with the detailed description of the preferred embodiment, the operation of the preferred embodiment will be described in general terms with reference to FIG. 1.

Located near the rear guide rod 15 is a primary index means which is used for selectively indexing, or locking, the carriage at locations along the track, which locations are a predetermined distance apart. To this end, there is provided a horizontally disposed channel member 23 having a row of teeth (to be described below). Then, by means to be described below, a pawl carried by the carriage 17, is selectively moved into engagement with the teeth or out of engagement with said teeth by rotation of a knob 24 disposed at the rear of the carriage 17.

By the primary index means, the carriage may be selectively locked at any one of the primary locations which are preferably one inch apart. For purposes of enabling the operator to observe at what primary position the carriage is located, there is provided a scale 25 extending between the support brackets 13. The scale 25 has a series of marks, or graduations, 26 which are one inch apart and are sequentially numbered from left to right with the 0 mark 26 being near the left side of the table 10. By way of example, there could be provided thirty-seven marks 26 numbered from 0 to 36.

As can be seen in FIGS. 1 and 2, the scale 25 extends through a slot near the upper edge of the carriage 17. Additionally, there is provided a window 27 in plate 28 for purposes of observing the scale 25. Pointer 29 in the window 27 is provided to assist the operator. When the pointer 29 is lined up with one of the marks 26, the aforementioned pawl may be moved from its retracted position into its engaged position. However, as will be described, the pawl can only be moved into the engaged position whenever the carriage 17 is exactly in one of the primary positions, i.e., at an even inch position.

Before going on with the detailed description of the manner in which the preferred embodiment is constructed, the use of the apparatus will be described generally. Firstly, the operator turns the knob 24 to disengage the aforementioned pawl. He then moves the carriage 17 to the left on the guide rods 15 until the pointer 29 is lined up with the graduation 26 indicated as 0. He will then position the subcarriage 18 to the left relative to the carriage 17 until the indicator (to be described) on the positioning means indicates 0. At that time, he will position on the table 10 the drawing having the two marks the distance between which is to be measured. He will position the drawing with the left hand one of the two marks at, or nearly at, the intersection of the lines 12 and 12a. The said intersection of the lines 12 and 12a is positioned so that it is aligned with the above mentioned across hair in the microscope 19 when the carriage 17 is at the "zero" position and the sub-carriage 18 is at the "zero" position. The righthand mark on the drawing is located on line 12a which extends along the path of travel of the field of observation of the microscope 19 as the carriage 17 is traversed along the guide rods 15.

Then, by means to be described, he will adjust the microscope 19 to the right or left relative to the carriage 17 as necessary without changing the indication of zero on the position means. By this method, the apparatus can be "zeroed" on th e lefthand mark with extreme accuracy.

At that point, the operator turns the knob 24 to disengage the primary index means and slides the carriage 17 to the right to the even inch primary location where the microscope 19 is just to the left of the righthand one of the two marks being measured, and turns the knob 24 to lock the carriage 17 in that primary position. The operator then actuates the position means to translate the subcarriage 18 to the right relative to the carriage 17 until the cross hair in the microscope 19 is aligned with the righthand mark. The reading through the window 27, in combination with the reading on the position means 20, gives the operator an accurate measurement of the distance between the two marks.

Referring now to FIGS. 2 to 8, the structure of preferred embodiment of the persent invention will be described in further detail. In order to facilitate the sliding movement of the carriage 17 along the guide rods 15, there are provided bearing sleeves 31 in the carriage. In some cases, frictionless bearings are used, however, sliding bearings will accomplish the desired results.

As mentioned previously, the channel member 23 carries a row of teeth which are used in conjunction with locking the carriage 17 in any of its primary locations. Preferably, the row of teeth is made by a series of short gauge blocks 33 and long gauge blocks 34, which are located alternately in the recess of the channel 23. (See FIGS. 2, 4, 5, and 6.) Preferably, the long gauge blocks 34 are approximately ⅛ inch to ³⁄₁₆ inch longer than the short blocks 33 in order to provide preferred rectangular recesses to recessive the above mentioned pawl. The blocks 33 and 34 are all ½ inch wide.

At the rear of the carriage 17 there is disposed a boss block 36 (see FIGS. 2 and 4 in particular). The boss block 36 has a vertically disposed shaft 37 journaled therein with the knob 24 attached to the upper end of the shaft and a disc 38 at the lower end of the shaft. The disc 38 supports a depending pin 39 which is mounted eccentric from the axis of rotation of the shaft 37 for a purpose which will now be described. Secured to the bottom of the boss block 36 is a bottom plate 40 having a cavity which receives a pawl 41 having a cross-slot 42 at the right end thereof (as seen in FIG. 4). The cross-slot 42 receives the depending pin 39, and because of the accentricity of the pin, the pawl 41 may be moved from the retracted position shown in FIG. 5 to the extended position shown in FIG. 6 by a 90° rotation of the knob 23, and vice versa. It will be noted that the pawl 41 is slightly chamfered at its left end (as seen in FIGS. 5 and 6) to facilitate insertion in the recess formed between the gauge blocks 34.

Referring now to FIGS. 2, 3, and 4 in particular, the manner in which the microscope 19 is mounted will be described in further detail. The microscope has a cylindrical barrel and is slidably received in a vertical hole 48 in the subcarriage 18 to permit focusing. To the end of moving the microscope for focusing purposes, there is provided a rack gear 49 on one side of the barrel of the microscope 19. Also, there is provided on the subcarriage 18 an upstanding support 50 having a cavity 51 in which is rotatably supported a pinion gear 52 on a shaft 53. The pinion gear 52 engages the rack gear 49, and accordingly, by turning either of thumb wheels 54, the microscope 19 may be displaced vertically for focusing purposes.

As mentioned previously, the row of teeth formed by the gauge blocks 33 and 34—in combination with pawl 41—will serve to lock the carriage 17 in any of the even inch primary locations; however, the apparatus must also include means for accurately displacing the microscope 19 relative to the carriage 17 so as to observe a mark at a position which is not at one of the even inch positions.

Referring now to FIGS. 2, 3, 7, and 8, a preferred position means for changing the position of the subcarriage 18 relative to the carriage 17 will now be described. In FIG. 7, it can be seen that a collar 56 is secured to the righthand side of the carriage 17 and fixed there by means such as a set screw 57. The collar 56 has at its right side a slightly enlarged cylindrical portion 58 with the axis of the cylindrical portion parallel to the desired path of linear movement of the subcarriage 18 relative to the carriage 17. It will be noted that the cylindrical portion 58 has a plurality of axial slots 59 for a purpose which will now be described. Intermediate member 61 has at its right end a reduced portion 62 with internal threads. The central portion of the intermediate member 61 is counterbored as at 63 in order to facilitate alignment of compression coil spring 64. Additionally, the intermediate member 61 is provided with an enlarged cylindrical portion 65 which is joined to the main portion of the intermediate number by legs, or arms, which extend through the above mentioned slots 59 in the cylindrical portion 58. Therefore, the intermediate member 61 may be moved to the right or left relative to the collar 56 (and therefore the carriage 17), but it can not rotate about its axis.

At the left end of the cylindrical portion 58, the collar 56 has been recessed to form a shoulder 67 which aligns and prevents rightward movement of the hand wheel 22 for a purpose to be described. The hand wheel 22 is provided with a tube portion, or skirt, 68 which has internal threads which cooperate with external threads on the enlarged cylindrical portion 65 of the intermediate member 61. The function of the cooperation of the hand wheel 22 and the intermediate member 61, to wit, to adjust the location of the position means 20 relative to the carriage 17, will be described in further detail below.

The position means 20 also includes a barrel 70 which is shrunk fit onto the intermediate member 61 at the right end of the enlarged cylindrical portion 65. Therefore, the barrel 70 does not rotate but moves to the right or left with the intermediate member 61.

As best seen in FIG. 2, the barrel 70 has a series of indicator marks 71 and an axially extending index line 72 which marks and line function as will be described. Additionally, the position means 20 preferably includes an indicator cap 73 having a centrally disposed threaded stem 74 with the said threads of the stem cooperating with the internal threads of the reduced portion 62 on the intermediate member 61. As in the case of the collar 56, the intermediate member 61 and the barrel 70, the cap 73 is preferably made of a material such as aluminum to reduce weight and expense. For a purpose to be described, there is provided a steel shaft 75 extending axially through the position means 20 with a plug 76 functioning to fix the shaft in its proper position on the axis of rotation of the indicator cap 73. The indicator cap 73 is also provided with a skirt 77 having a series of graduations 78 on its tapered edge 79 with numerical indication of the value of the graduations being imprinted on the exterior of the skirt 77.

At the lefthand side (as seen in FIG. 2) of the subcarriage 18 there is provided a compression coil spring 80 encircling a guide pin 81 fixed to the subcarriage 18 and slidably extending through a hole in the left side of the carriage 17. On the righthand side of the subcarriage 18, there is provided a recessed steel ball 82 which provides a protuberance positioned at the axis of rotation of the steel shaft 75. With this arrangement, the subcarriage 18 may be made of aluminum as is the carriage 17 since the steel of the ball 82 and the shaft 75 will prevent wear even though the shaft 75 is rotated relative to the ball.

The manner of operation of the position means 20 is as follows. Assuming that the carriage 17 has been located in the desired even inch primary location, the indicator cap 73 is rotated, whereby the indicator cap moves along the axis of the position means 20 by cooperation of the threads on the stem 74 and the reduced portion 62. This rotation is continued until the left end of the tapered edge 79 is substantially even with the indicator mark 71 on the barrel 70 marked 0, and the graduation on the skirt 77 marked 0 is aligned with axially disposed index line 72 on the barrel (see FIG. 2 in particular). As in the case of many micrometers, the relationship of the threads on the stem 74 to the spacing between the indicator marks 71 is such that the cap 73 will advance axially the distance between two indicator marks 71 each time the cap is rotated 360°. Further, the graduations 78 on the tapered edge 79 divided the skirt 77 into twenty-five equal parts with sub-graduations dividing each part.

With this arrangement, assuming that the cap 73 has been turned until the left end of the skirt 77 is at the indicator mark 71 marked 0, and the particular graduation 78 marked 0 is at the index line 72, and then the cap 73 is rotated counterclockwise (as seen from the right side of FIG. 2), the distance that the cap 73 moves to the right (and therefore the left end of the shaft 75 moves to the right) may be very accurately measured. Since the spring 80 causes the sub-carriage 18 to follow the rightward movement of the shaft 75 relative to the carriage 17, the displacement of the microscope 19 may also be very accurately measured.

The manner of operation of the adjustment means which includes hand wheel 22 is as follows. After the indicator cap 73 has been turned to the "zero" position, and the carriage 17 has been put in the "zero" position, the operator places the drawing involved in position below the microscope 19 with the lefthand mark to be measured at, or nearly at the intersection of the lines 12 and 12a which intersection is in the optical view of the microscope. It is very difficult to position the drawing exactly below the cross hair of the microscope, however, by turning the hand wheel 22 the whole of the position means 20 (and therefore the microscope 19) may be adjusted to the right or left. More particularly, if the hand wheel 22 is rotated, the cooperation of the threads of the tube portion 68 and the cylindrical portion 65 cause the intermediate member 61 to move to the right or left relative to the collar 56 (and therefore the carriage 17) according to the direction of rotation of the handwheel. And, since the barrel 70 and the indicator cap 73 move with the intermediate member 61, the left end of the shaft 75 may be lineally displaced without rotation of the indicator cap.

As can be seen, the present invention lends itself to being economically produced, and the resulting apparatus is compact and simple to use. Of particular importance is the simple manner in which the use of the gauge blocks 33 and 34 results in a row of teeth having very accurate dimensional characteristics. Further, the effect of any slack in the cooperation between the threads on the portion 62 and the stem 74 removed by the spring 80, and the effect of any slack in the cooperation between the threads on the portions 65 and 68 is removed by the spring 64. Additionally, a drawing or photo negative, or printed circuit board, or other sheet type objects, may be quickly and easily located on the table 10 since the compact construction of the carriage 17 and associated apparatus does not obstruct rapid positioning of the drawing.

While only a few embodiments of the present invention have been shown and described in detail, it will be apparent to those skilled in the art that such is by way of illustration only and numerous changes can be made thereto without departing from the spirit of the present invention.

We claim:

1. Apparatus particularly adapted for measuring distance between two marks on a generally planar object, said apparatus comprising:
   a table having a flat upwardly facing surface;
   a track positioned above said table and extending parallel thereto;
   means for causing light to be emitted up from said surface;
   a narrow line on said surface extending parallel to said track and limiting upward emision of light from said surface;
   a carriage movably supported on said track, said carriage having a collar;
   a subcarriage movably supported on said carriage for movement parallel to said narrow line;

primary index means operatively connected to said table and to said carriage for selectively indexing said carriage at primary locations along said track;

optic means disposed on said subcarriage directly above said narrow line for permitting a person to view a mark on a planar object disposed immediately below said subcarriage on said line;

position means operatively connected to said carriage and subcarriage for changing the position of said subcarriage relative to said carriage, said position means comprising:

a cylindrical barrel having an axis and being adjustably connected to said carriage for adjustment movement parallel to said narrow line and along the axis of said barrel;

a shaft operatively connected to said subcarriage and received through said barrel and said collar on said axis of said barrel;

means on said barrel and shaft for moving said shaft relative to said barrel and for indicating the position of said shaft relative to said barrel along the axis of said barrel;

and adjustment means for adjusting the position of said barrel relative to said carriage, said adjustment means comprising:

a cylindrical intermediate member fixed to said barrel coaxial therewith and receiving said shaft therethrough, said intermediate member being restrained against rotation relative to the carriage around the axis of said barrel;

a generally cylindrical component coaxial with said barrel and being rotatably connected to one of said collar and intermediate member and being threadedly connected to the other of said collar and intermediate member for rotation relative to the carriage about the axis of said barrel, whereby rotation about the axis of the barrel of the generally cylindrical component in either direction relative to the collar will cause a corresponding movement of the intermediate member, barrel and shaft in either direction along the axis of said barrel.

References Cited

UNITED STATES PATENTS

| | | | |
|---|---|---|---|
| 280,339 | 7/1883 | Barnes | 33—164 |
| 325,233 | 9/1885 | Barnes | 33—165 |
| 597,335 | 1/1898 | Spalding | 33—170 |
| 1,266,977 | 5/1918 | Nelis | 33—170 |
| 2,144,972 | 1/1939 | Hirst | 33—170 X |
| 2,225,500 | 12/1940 | Kelsey | 33—170 |
| 2,237,515 | 4/1941 | Williams | 33—125 |
| 2,369,645 | 2/1945 | Bigarani et al. | |
| 2,758,383 | 8/1956 | Breit | 33—170 |
| 2,999,315 | 9/1961 | Benson | 33—1 |
| 3,165,834 | 1/1965 | Benton | 33—1 |
| 3,166,845 | 1/1965 | Pascoe et al. | 33—1 |
| 3,355,810 | 12/1967 | Franklin | 33—125 |

FOREIGN PATENTS

| | | |
|---|---|---|
| 251,837 | 5/1926 | Great Britain. |
| 555,060 | 8/1943 | Switzerland. |

ROBERT B. HULL, Primary Examiner

U.S. Cl. X.R.

33—165